June 4, 1963

E. D. TURNER 3,091,810

INJECTION MOULDING MACHINES

Filed Dec. 30, 1960

Inventor
Edward D. Turner
By his Attorney

June 4, 1963  E. D. TURNER  3,091,810
INJECTION MOULDING MACHINES
Filed Dec. 30, 1960  8 Sheets-Sheet 7

United States Patent Office 3,091,810
Patented June 4, 1963

3,091,810
INJECTION MOULDING MACHINES
Edward D. Turner, Highfield, Whitchurch, near Aylesbury, England, assignor to United Shoe Machinery Corporation, Flemington, N.J., a corporation of New Jersey
Filed Dec. 30, 1960, Ser. No. 79,653
Claims priority, application Great Britain Apr. 12, 1960
2 Claims. (Cl. 18—30)

The subject of this invention is a plastic injection molding machine of the type having a plurality of mold sets mounted on, or associated with, a rotatable carrier.

Commonly in this type of machine, the carrier is indexed to bring each set in turn into an injection station where it cooperates with a fixed injector, before passing on through other stations to an ultimate ejection station at which the molded article is stripped from the set. The present invention is more particularly concerned with improved means for performing the mold opening, the ejection of the molded article(s), and the re-closing of the mold in such a machine. In addition, however, it confers other beneficial features to the operation of the machine, as will appear from the description which follows.

Broadly stated, then, an injection molding machine in accordance with the present invention, being of the type set forth above, has, at a station around the path of intermittent rotary travel of the mold sets on the carrier, a magnetic device arranged for cooperation with individual mold sets in turn so as to open, or assist in opening, them and then to re-close them after the stripping and the ejection of the moldings concerned.

As will therefore be appreciated, on arrival of each individual mold set at the mold-opening and ejection station the magnetic device is arranged to move in, engage a member of the mold set and separate it, or assist in separating it, from the other member(s) of the set and then, when the or each molded article has been ejected, to return with its engaged mold member to reclose the mold and release this member ready for the next indexing step of the carrier.

The use of a magnetic device for this purpose affords several advantages. In the first place experience teaches that the closure-adherence of a mold which has been injected under high pressure can be quite considerable, and it has been found that the distributed grip afforded by a magnet is very effective in loosening tenaciously-closed molds.

Again, the use of a magnetic head eliminates the need for very precise positioning of the mold-separating means, because such a head can compensate for virtually any possible malpositioning due to wear on the parts, temperature variations, or other causes.

Another attribute is that a magnetic device for the purpose here concerned can be comparatively compact and monopolise little of the precious room in the working zone of the machine and around the path of travel of the carrier.

Further where use is made, as preferred, of an electromagnet, it can be magnetised and demagnetised by simple switch means thereby avoiding cumbersome mechanical gear for engaging and releasing the mold members.

Thus, in one embodiment the magnetic device comprises at least one projecting electromagnet which is adapted to be energised in response to the operation of a switch by closure of the carrier towards the headstock.

By a further feature, pusher means are associated with the electromagnet and are movable, in correlation with the deenergising of the magnet, to ensure parting of the mold part from the magnet. This will ensure that the mold-closing operation will not be handicapped due to reluctance of the withdrawn mold part to leave the magnetic device at the appropriate time due to residual magnetism in the pole piece after de-energisation.

The switch controlling the energisation of the electromagnet may be operable by an abutment carried by an auxiliary headstock plate which is slidable on said tie bars face-to-face with the headstock. The use of an auxiliary headstock plate is favoured because of the known advantages of sprue separation and control of the injector nozzle which it affords at the injection station, and it then offers a conveniently movable part for operating a switch.

Again, the magnetic device may include a carriage which is reciprocable on a frame, mounted on the headstock, by piston/cylinder means in response to the operation of switch by closure of the carrier towards this headstock.

In this event, the magnetic device may also include a guide frame on which the said carriage is reciprocable, this frame being disposed in a lateral insert in the headstock and being pivoted to the latter to enable the complete device to be swung into an out of the way position. This has the considerable advantage that the ejection space can be cleaned, if so required, e.g. when adapting the machine temporarily to some other system, such as that described in my application for United States Letters Patent Serial No. 196,730, filed May 22, 1962.

As previously indicated, it is intended that the magnetic device shall be stationary as regards the direction of rotation of the carrier (although it will, of course, be required to move in the mold-opening direction), and that the operation of the molding-ejection means shall be correlated therewith and be effective when the mold is opened. In short, it is preferred to devise the assembly so that the ejection means and the magnetic device are mutually-assisting.

With this aim in view, each mold set may be equipped with a thrust and ejector device which acts from the opposite end of the set to the magnetic device and which, in effect, actually initiates the mold opening and subsequently ejects the work from the open set. In performance of this, for instance, the thrust part of the device, after mechanically initiating the mold opening (which function it sooner or later surrenders to the magnetic device), picks up the ejector part after a stage of lost motion travel and causes the work to be pushed out of the opened mold set.

In preferred arrangements dedicated to this purpose the thrust and ejector parts are mounted in tandem at the rear of a mounting on the carrier on or against which a fixed mold member is supported. The thrust device is coupled to the movable mold member by rods passing through the fixed mold member, and the ejector device has means, also passing through the fixed mold member, to cause ejection of the molding(s). Thus, when the mold assembly reaches the opening and ejection station and the magnetic device moves in, engages the movable mold member, and starts to move out again with this member, there is first a period of lost motion travel of the thrust plate in the axial direction until it picks up the ejector plate and thrust it forward to eject the work from the mold, which is then open and continuing to open.

The mechanism for converting the axial movement of the ejector device into a stripping of the mold will depend on the form of the molding. In the simplest instances, the ejector part may be a plate carrying an ejector pin or pins. The number of pins will depend on the size of the molding or whether a multiple mold is in use. A sprue-removing pin may also be included.

Where the work is molded with a a screw thread, the ejector part will be devised to rotate the work, or the mold member, in response to its axial travel, and an example of this arrangement is described below.

This invention has been devised particularly for use in an injection molding machine in which a carrier, as referred to above, for a plurality of mold sets, is rotatable about a horizontal axis in the machine so as to present the individual mold sets in turn to a horizontally-acting injector.

An injection molding machine incorporating the present invention and detailed features thereof is illustrated in the accompanying drawings, in which.

General Construction

Figure 1:
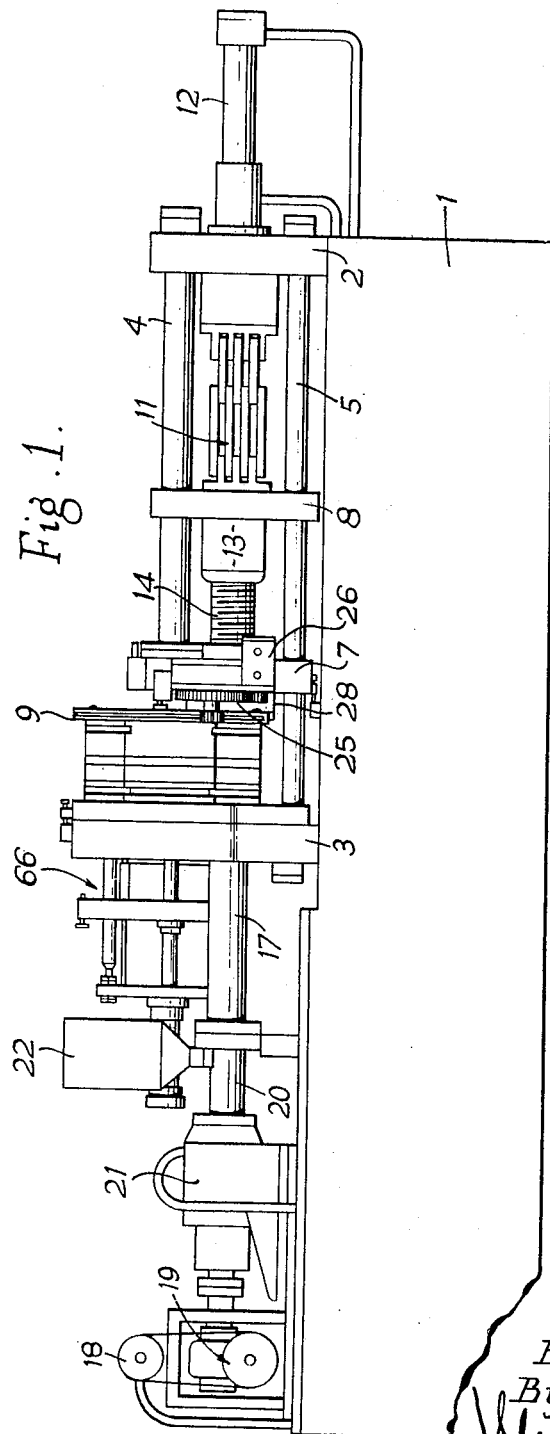
FIGURE 1 is a diagrammatic rear elevational view of the machine.
Figure 3:
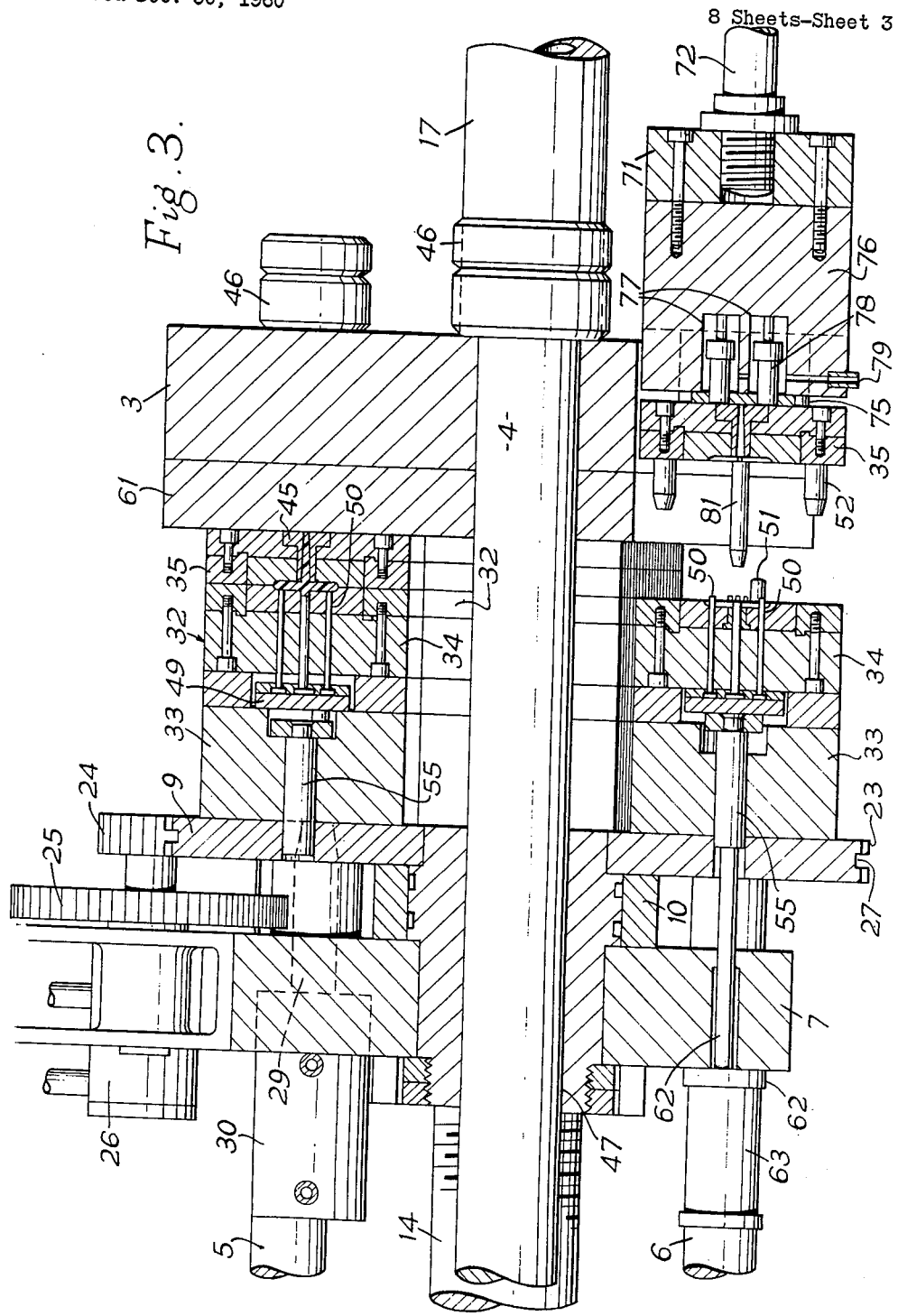
FIGURE 3 is a horizontal cross section through the central zone of the machine seen in FIGURE 2.
Figure 5:
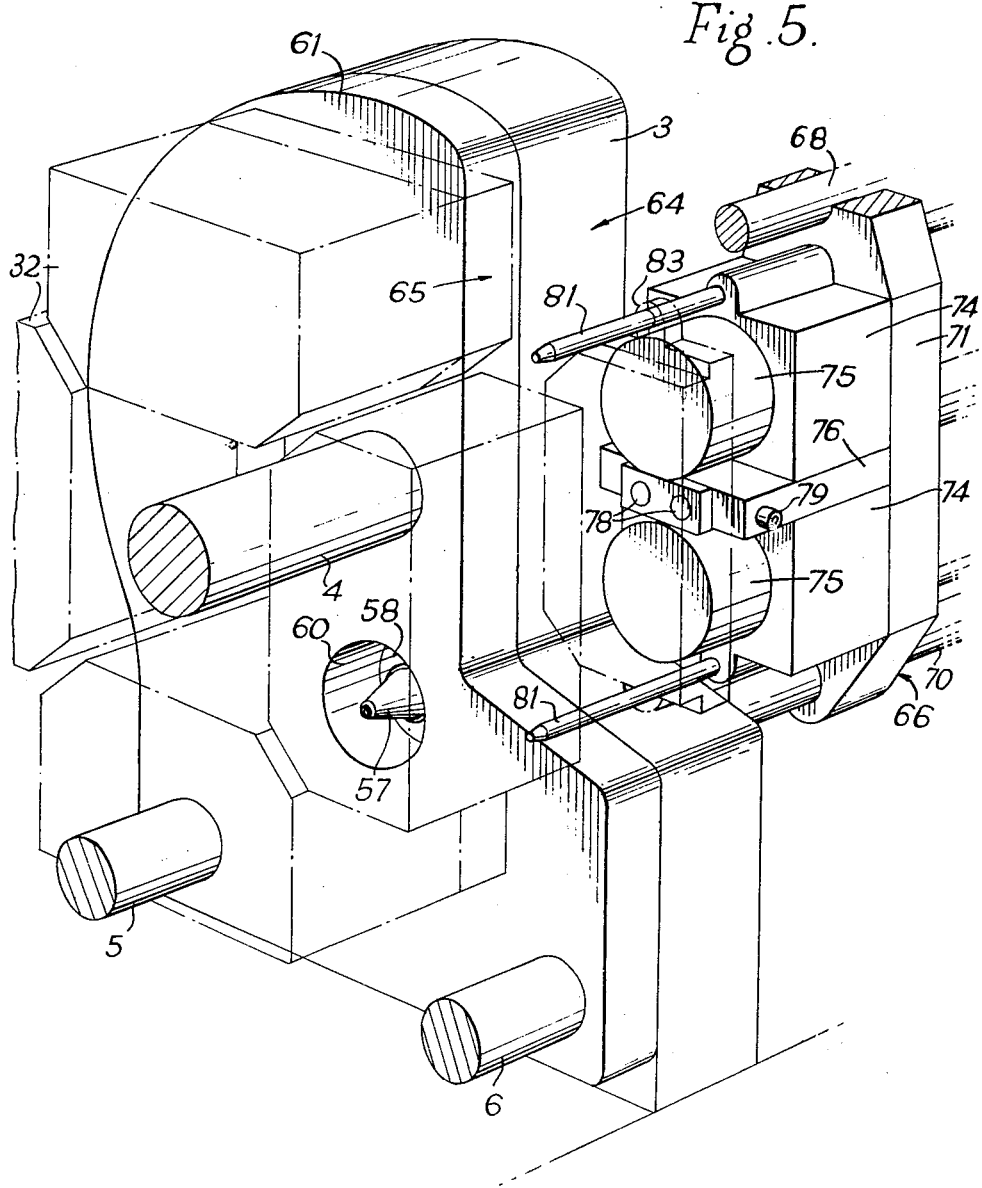
FIGURE 5 is a perspective view of the headstock of the machine and of the mold opennig equipment.

The injection molding machine portrayed in the drawings, and generally in FIGURE 1, is mounted on a bed or frame 1, from which upstands a fixed tailstock plate 2 and a fixed headstock plate 3. These are braced together by powerful tie bars 4, 5 and 6 (see also FIGURE 5) with clamping lock nuts 46. These bars are arranged in symmetrical triangular fashion with the largest bar 4 at the apex. Slidable on these tie bars are front and rear thrust plate, 7 and 8 respectively. The former of these (which will hereinafter be referred to as the "backing plate") serves as a backing for a mold carrier plate or disc 9 which, through a central bush 47, is slidable on the upper tie bar 4 (see FIGURE 3). A cylindrical block 10 is interposed between the backing plate 7 and the carrier 9.

The required reciprocating movements of the carrier plate 9 and its molds (to be described below) towards and away from the headstock 3 is produced by known means comprising in this case a toggle linkage generally denoted 11 in FIGURE 1, which can be extended and collapsed at appropriate times by the application of oil to one end or the other of a hydraulic cylinder 12 the piston of which is coupled to the mechanism 11. Further the thrust plate 8 supports, by means of a threaded nut 13, a forwardly-projecting robust screw 14 which, at its leading end, is received in a collar 15 on the backing plate 7. This screw can be rotated by a ratchet mechanism 16, thereby to turn in the nut 13 and vary the distance between the plates 7 and 8, i.e. to adjust the travel of the mold sets to and from the headstock 3 to the length of the molds. The ratchet mechanism 16 will not be described in further detail, as it is a well-known expedient in the art.

Provided at the other side of the headstock 3 is a normal form of straight line injector means, and this is here illustrated as comprising an injector cylinder 17 in which a pre-plasticising screw (not shown as this is standard equipment) is rotated by means of a motor 18 through gearing generally indicated at 19. The casing 20 around the rear end part of the pre-plasticising screw is supported in a bearing 21 and the interior of this casing is supplied with solid plastic material in the usual way from a hopper 22 opening into the same.

Mold Carrier and Mold Assembly

The mold carrier plate 9 is of circular configuration and is provided with perpiheral teeth 23 in mesh with a pinion 24 associated with a larger pinion 25 driven by the pinion of a hydraulic motor 26 and mounted on the backing plate 7. The toothed periphery of the carrier plate 9 is also provided with an annular groove 27 which receives a rib on a block 28 centrally disposed at the lower central part of the backing plate 7 and serving to reinforce the carrier plate 9 at the injection zone (see below) against the heavy stresses which are applied to this plate at the time of injection.

The carrier driving means 24—26 are operable, by means to be referred to later, to index the carrier plate through steps of 90°, and the plunger 29 of a hydraulic cylinder 30 is correlated with the operation of the motor 26 to enter apertures 31, appropriately spaced around the carrier 9, in sequence so as to ensure arrest of this carrier at the exact rotary position after each indexing movement.

Although the number of mold sets mounted on the carrier 9, and hence the angular range of each stage of intermittent rotation can be varied within this invention, in the example illustrated the carrier is assumed to have four mold sets 32 mounted thereon at equal spacing. Each of these sets (see FIGURE 9) is of substantially rectangular contour and comprises a base member 33, a fixed mold half 34 secured to the base member 33 through a peripheral fillet 39, and a movable mold half 35, which is capable of movement axially in relation to the mold half 34 and is guided in this movement by dowel pins 52 mounted therein and running in corresponding bores in the mold half 34.

The fixed mold half 34 is in two parts, viz. a body portion 36 and a die plate 37 which is removably attached to the former by bolts 38. Similarly, the movable mold half 35 consists of a body portion 40 and a die plate 41, these two being connected together by bolts 42. The die plates 37 and 41 are provided with complementary depressions forming molding cavities 43, and in the instance illustrated in FIGURE 9 there are assumed to be four cavities 43 arranged radially and at right angles to a central sprue channel 44 in a sprue bush 45 fitted into the movable mold half 35.

Disposed in the chamber 48 defined by the fillet 39 is an ejector plate 49 made in two parts which are clamped together and serve to trap between them the heads of work-ejector pins 50 passing through the mold half 34 and entering the various cavities 43. Also clamped between the parts of ejector plate 49 is the head of an ejector pin 51 which is aligned with the sprue gate, i.e. the bore in the sprue bush 45. It will also be noted from the drawings, and particularly FIGURE 9, that the base member 33 is centrally recessed at 53 and here receives a thrust collar 54 which is of less depth than the recess 53 and forms the head of a plunger 55 slidably mounted in aligned bores in the member 33 and in the carrier plate 9.

The plungers 55 of each of the mold sets is arranged to cooperate in turn, at an ejection station, with the axially slidable plunger 62 of a piston cylinder unit 63 which is mounted on the backing plate 7. Secured to the collar 54 at intervals therearound are thrust rods 56 which, when the mold set is closed and the collar 54 in its normal position abutting the bottom of recess 53, is flush with the outer face of the other face of the portion 37 of the fixed mold half 34.

Headstock Assembly

Figure 4:
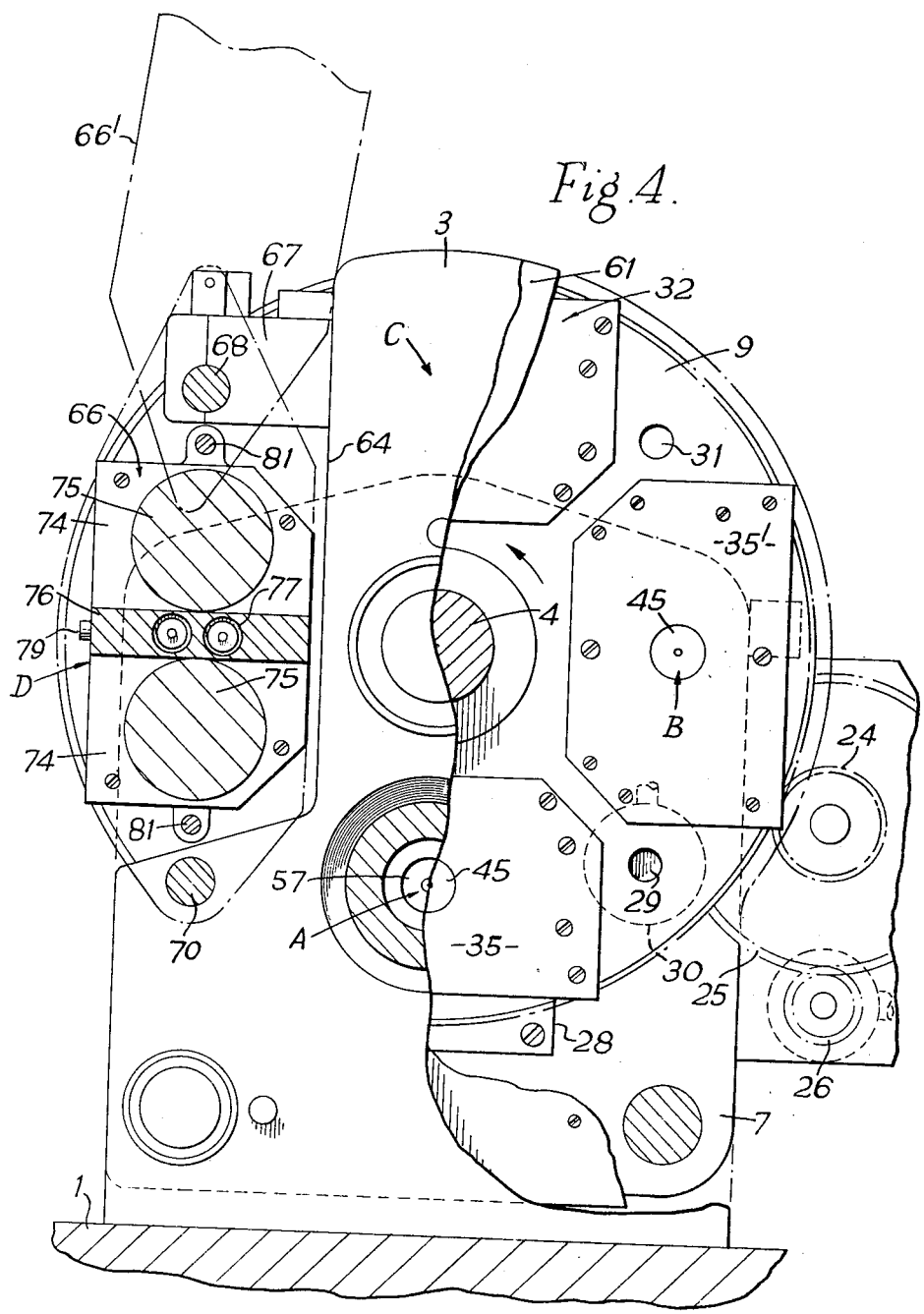
FIGURE 4 is a view, partly broken away, taken on the line IV—IV of FIGURE 2 in the direction of the arrows.

As indicated above, the mold carrier 9 in this machine is arranged to be indexed through 90° at each step, which means that each mold set 32 is arrested in turn at four stations which have been indicated A, B, C and D in FIGURE 4 of the drawings. Station A is the injection station and here the sprue bush 45 of the mold set reaching the station is brought into co-axial alignment with the nozzle 57 of the injector cylinder 17 which is stationed centrally in an opening 58 in the headstock 3 and a corresponding opening 60 in an auxiliary headstock plate 61 which is disposed at the injection zone side of the headstock 3.

This auxiliary plate 61 is shaped in conformity with the upper part of the headstock with which it registers, and it is slidable on the tie bars 4, 5 and 6. It is normally urged in a direction away from the headstock by springs 59 housed in pockets in the headstock, and its function is to break contact between the injector nozzle 57 and the sprue bush 45 of a recently-injected mold set when the daylight of the machine is being opened. This principle, which is known per se, affords a number of advantages, and in particular avoids the need to retract the injector cylinder to effect the sprue break and allow the nozzle to self-seal under the action of compressed plastic in the injection chamber.

At the stations B and C in the cycle of the mold sets, these molds are left closed for cooling purposes, but when each set reaches the station D it is arranged to be opened and the work ejected therefrom. It will be noted that, for this purpose, the headstock is provided with a lateral recess 64 providing an area in which the opening of the mould and the ejection can be performed, i.e. with a saving of space. The auxiliary headstock plate 61 is provided with a registering recess 65.

Magnetic Mold Opening Means

Figure 2:
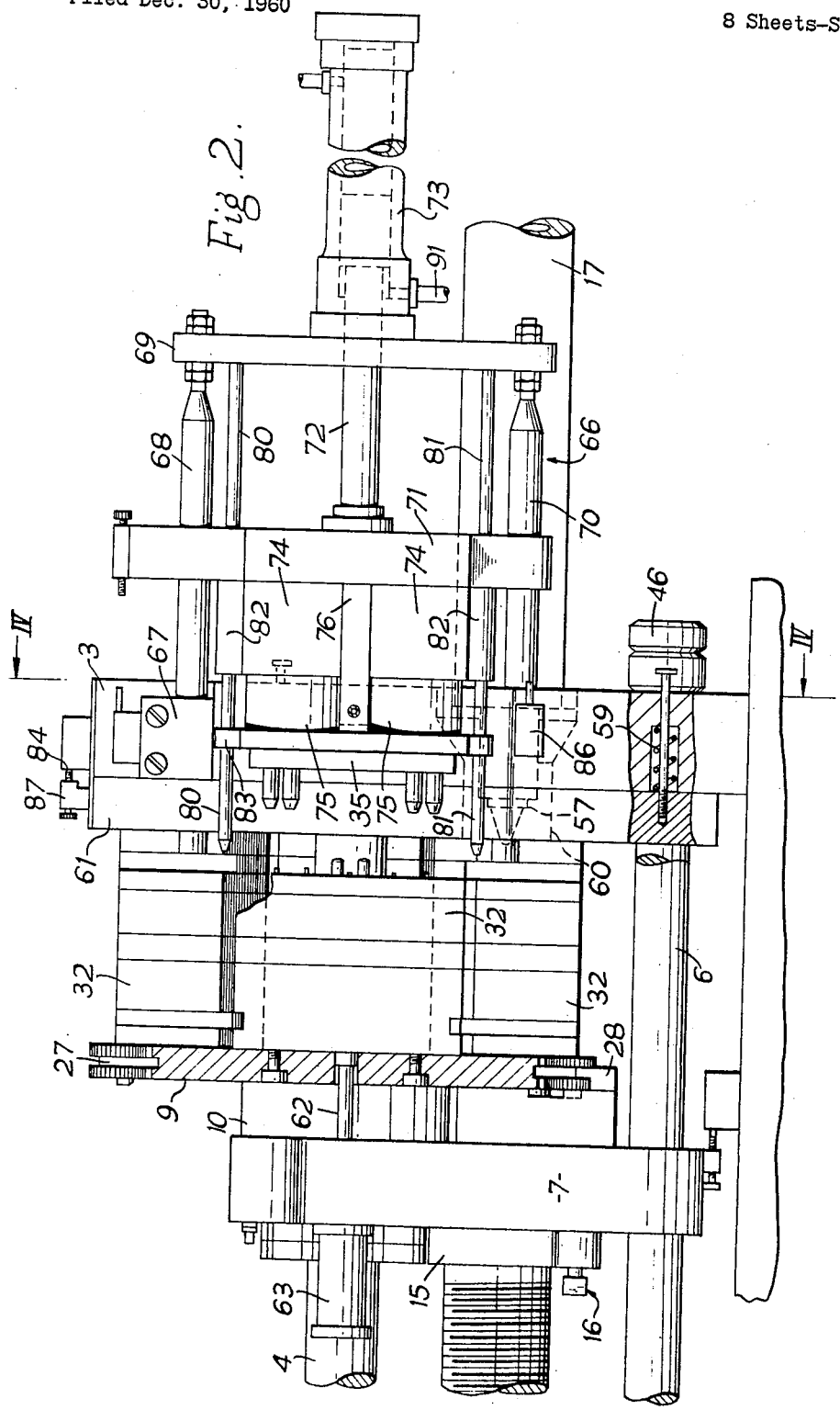
FIGURE 2 is a front elevation, on an enlarged scale, of the central part of this machine.

These have been generally designated 66 in the drawings and are mounted at the front side of the machine in the region of the ejection recesses 64, 65 by a bracket 67 on the headstock. In the first place the means comprise an upper longitudinal rod 68 which is supported by and rotatable in the bracket 67 and is threaded at its other end for the clamping thereon, by lock nuts, of one end of a frame plate 69 tapered to both ends. At its opposite end this plate 69 is similarly connected to the rear end of a support rod 70 which is parallel to rod 68 and is received at its forward end in a shouldered portion of the headstock 3 (see FIGURE 4). Fastening bolts (not shown) are used to retain the frame bars 68 and 70 in the relative positions seen in FIGURE 2 when the magnetic means is in normal use.

Apertured for sliding movement on frame bars 68 and 70 is a magnet carriage 71. This carriage is adapted to be reciprocated longitudinally of the machine, under the guidance of the rods 68 and 70 by the plunger 72 of a piston cylinder unit 73 which is fixed on the frame plate 69. Mounted at the front side of the carriage 71 are a pair of housings 74, each of which contains inductive windings for magnetising a solid steel, cylindrical head 75 which projects outwards therefrom. The housings 74 are arranged one vertically above the other, with a parting block 76 between them, and this block has side-by-side recesses 77 at the front thereof, each receiving the piston of a forwardly projecting plunger pin 78. As will be later explained, admission of compression fluid at required times through an admission line 79 enables the pins 78 to be projected forward and assist parting of a mold from the magnetic heads 75.

It will be noted that the fixed frame plates 69 also have projecting forwardly therefrom, and parallel with the rods 68 and 70, more slender rods 80 and 81 which extend through bored lugs 82 on the housings 74 beyond the leading end of the assembly to form guide rods for lugs 83 on the movable mold halves 35 of successive mold sets.

Finally, it is to be observed that the magnetic means 66 can be swung, as a whole, into an out of the way position, as at 66′ in FIGURE 4, when not required for use and after removal of the fastening bolts referred to. The vacated recesses 64, 65 could, for instance then be used as an ejection area in the event of an adaption of the machine to the principles set forth in my application for United States Letters Patent Serial No. 196,730, filed May 22, 1962.

Operation

As has already been indicated, the carrier plate is rotated intermittently through 90° to bring each mold set in turn into injecting position at station A. Simultaneously with this step, of course, one of the mold sets is brought to station D ready for opening and removal of the moldings therein. Since the actions germane to the present invention occur at this station D, the cycle of operations which follow these at each pause in the rotary travel of the carrier will therefore now be described, with reference to the accompanying FIGURES 6, 7 and 8 which show stages in this cycle.

In the first of these it is taken that the carrier plate 9 has just been indexed into the new position with the gap between the auxiliary headstock plate 61 and the headstock 3 open and the toggle linkage collapsed in retracting the carrier plate 9 etc. The magnetic heads 75 are forward.

It will be noted that the headstock 3 is equipped with micro switches 84, 85 and 86, these respectively cooperating with an abutment 87 on the auxiliary headstock plate 61, an adjustable abutment screw 88 on the magnet carriage 71, and an adjustable abutment 89 also on this carriage. Of these the switches 84 and 85 respectively control the energising and deenergising of the magnets, in each case with a positive action of the micro switch concerned and without reverse operation when the switch is released.

Figure 6:
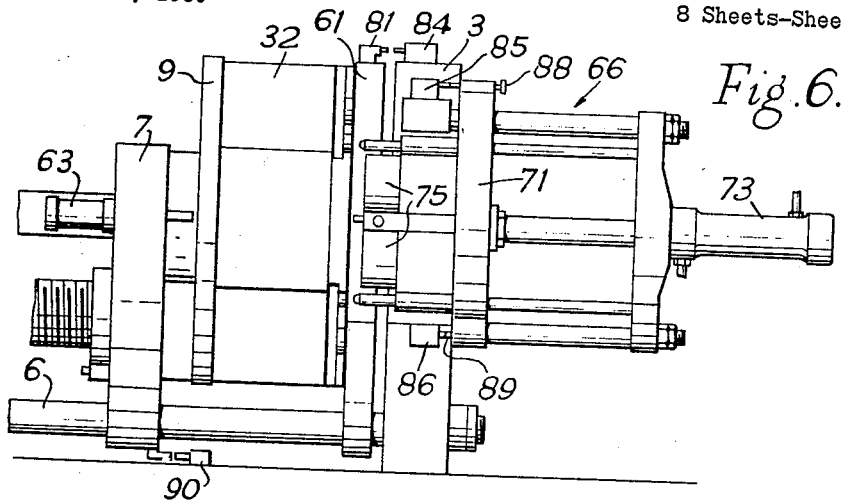
FIGURES 6, 7 and 8 are diagrammatic illustrations representing stages in the operation of the machine.

At the stage indicated in FIGURE 6 the magnets are de-energised.

Figure 7:
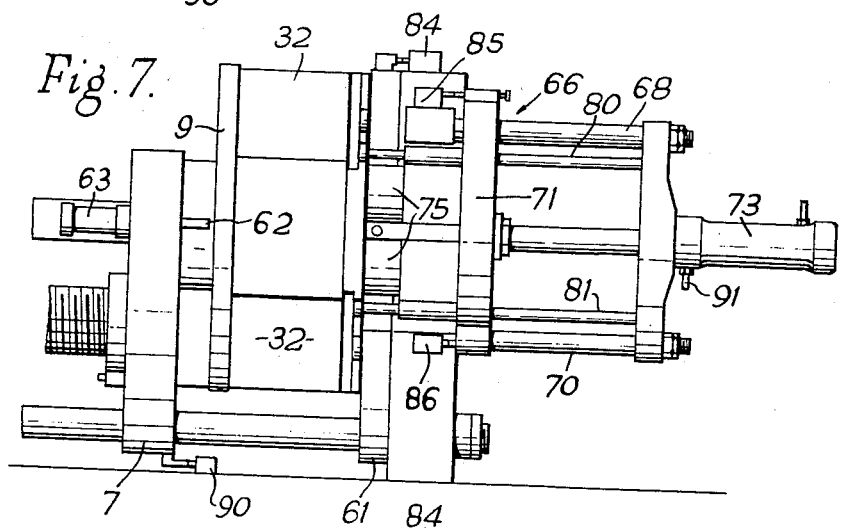

The next phase in the cycle is illustrated in FIGURE 7, i.e. the closure of the daylight of the machine by the straightening of the toggle mechanism 11, as a result of which the carrier 9 and the mold sets 32 are advanced so as to close the auxiliary headstock plate 61 against spring action against the headstock 3. The switch 84 is consequently depressed and the magnets 75 energised. This action may be accompanied by the switching on of an indicator lamp (not shown) to confirm to the operator that the necessary magnetic switching has occurred. It will be noted, moreover, that under the conditions of FIGURE 7 an abutment on the backing plate 7 has operated a further micro switch 90 fixed on the bed of the machine, and the result of this is to initiate the retracting movement of the magnetic assembly 66 by a fluid pulse through a line 91 to the piston/cylinder unit 73. At the same time the closuse of this switch 90 is arranged to initiate a hydraulic pulse through the cylinder 63 to advance the plunger 62 of the latter.

In this forward movement, the plunger 62 abuts against the plunger 55 thus (see FIGURE 9) advancing the thrust collar 54 rightwards. The resultant thrust by the rods 56 against the face of the mold half 35 initiates the opening of the set and, simultaneously, or practically simultaneously, the outer face of this movable mold half 35 is seized by the magnetic attraction of heads 75 so that this part 35 moves away from the mold half 34 between the rods 57 and the magnets which latter are now being retracted by units 73. Mold half 35 is guided during this movement first by the dowels 52 and then by the rods 80, 81. Thus, should for any reason there be a failure of the magnets, the molds will remain correctly supported.

Continuing its rightwards movement (see FIGURE 9) the thrust collar 54 abuts the ejector pin 49 and moves it to the right within the chamber 48. During this movement the plate is guided by pillars, such as 92, and the pins 50 and 51 act to push out the molded articles, from the cavities 43, and the sprue gate respectively. These can then be collected by an appropriately-disposed receptacle or chute.

Figure 8:
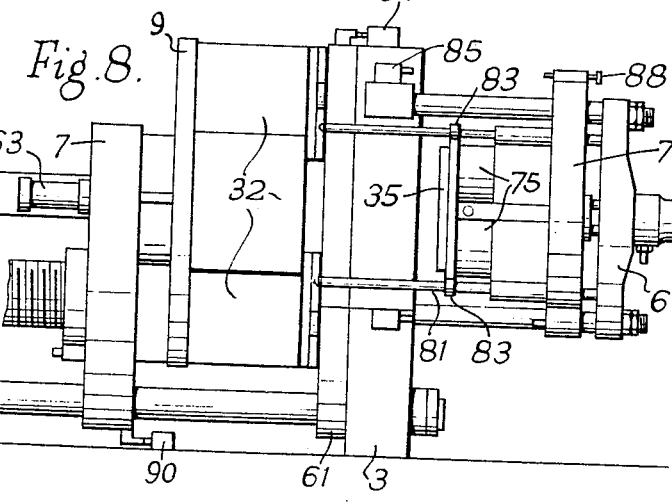

During the stages illustrated in FIGURES 6 and 7, the mold set at the injection station is duly injected and remains closed against the auxiliary headstock plate, and this situation continues until the magnet carriage 71 is fully retracted into the position illustrated in FIGURE 8.

This figure shows that the mold part 35 has been withdrawn a substantial distance, (which is readily catered for by the ejection recesses 64 and 65 in the headstock and the auxiliary headstock plate); this relatively wide clearance will thus allow for retraction of a sizeable mold part and for the extraction of relatively long moldings without undue encumberance in the machine.

The arrangement is that the carriage 71 shall be returned as soon as it reaches its outer end position, and this is provided for by a time delay switch which is operable in response to the previous closure (see FIGURE 7) of switch 90. By variation of the time delay the degree of retraction of the carriage 71 and the magnetic heads 75 with the outer movable mold part 35 can be varied to suit the particular work.

Figure 9:
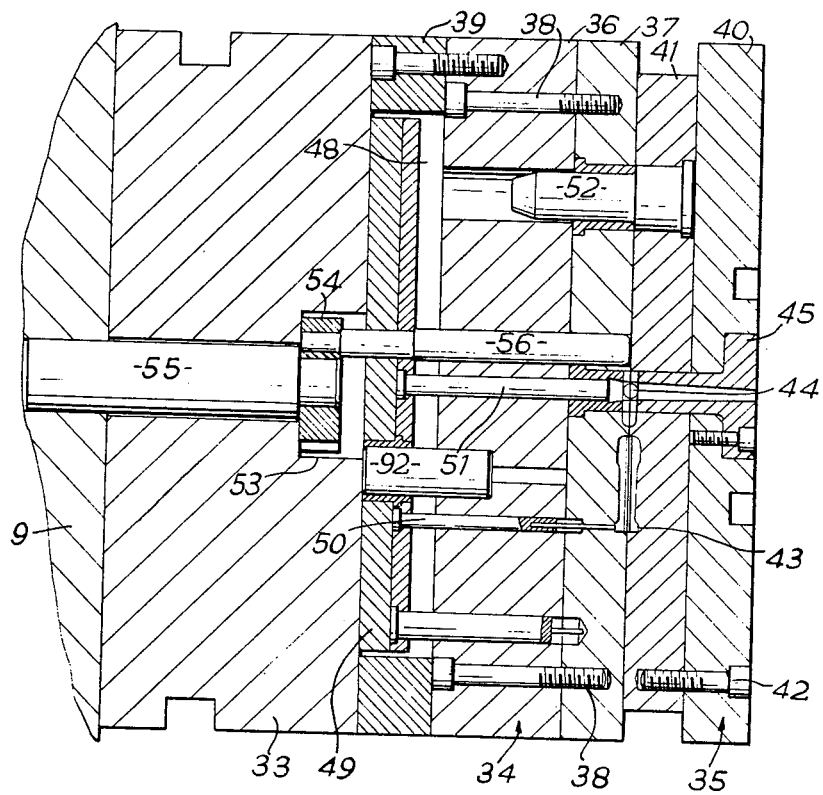
FIGURE 9 is a cross section through a typical form of the particular form of mold set assumed to be used in the machine illustrated in the preceding figures.

When the carriage 71 has returned to the FIGURE 7 position, the movable mold half has been pushed back to close the parent mold set and restore the mold condition illustrated in FIGURE 9, and the operation of the switch 85 then de-energises the magnets. The micro switch 86 is operated and this causes a flow of fluid into the cylinders 77 to advance the pins 78 and thus assist the mold part 35 in escaping from any residual magnetism in the heads 75.

The mold sets are now ready for re-indexing by collapse of the toggle mechanism 11 and rotation of the carrier 9.

Modified Mold

Figure 10:
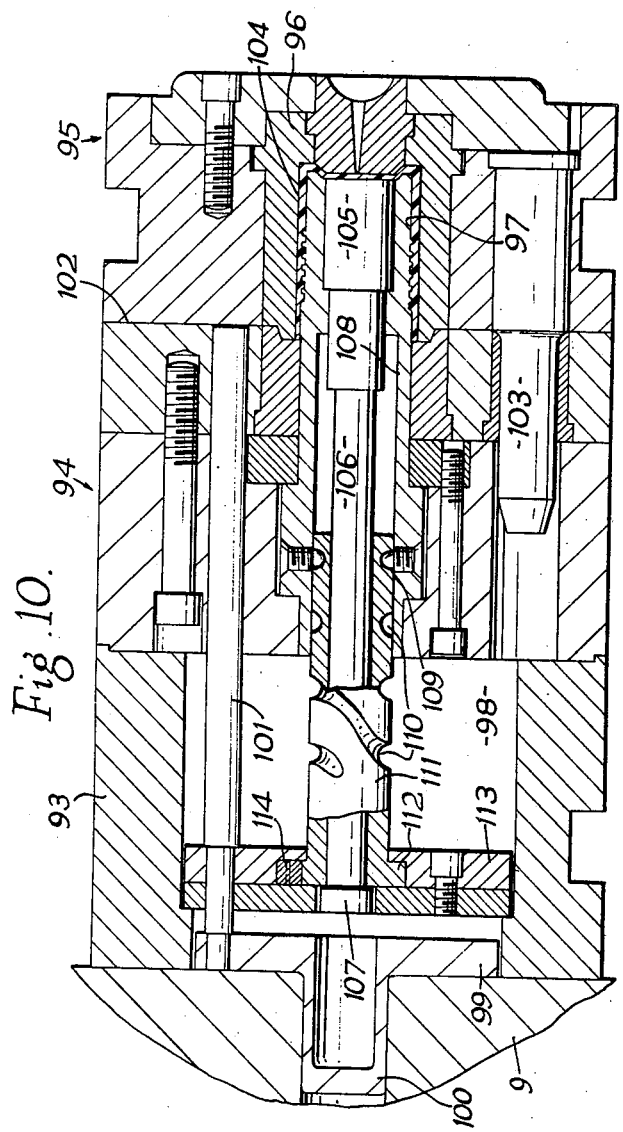
FIGURE 10 is a similar cross section through a modified form of mold with ejector means devised for the purpose of removing a screw threaded molded article.

It will be appreciated that the molding-ejection devices will be suited to the form of size of the moldings. An example of an arrangement which can be used in the case of a screw-threaded molding is illustrated in FIGURE 10.

In this instance the mold set can again be regarded as having three main components, viz. a base member 93 secured to the carrier plate 9, a fixed mold half 94, and a movable mold half 95 which is guided on mold half 94 by dowels 103. The molding cavity is in this case formed in a die 96 in the movable mold half 95, whilst the screw threaded interior of the molded article, designated 104, is defined by the head of a core or mandrel 97 which is disposed in the fixed mold half 94 and projects into the cavity of die 96.

In this case it will be noted that the base member 93 is provided with a stepped hollow interior 98 and therein receives a circular thrust plate 99 having a rearwardly directed hollow spigot 100, the purpose of which will appear hereafter. The plate 99 has a plurality of forwardly extending thrust rods 101 secured thereto and passing through the fixed mold half to bear against the inner face of the movable mold half.

In this case, however, in view of the ejector pins used in the preceding embodiment, means are provided for unscrewing the molded article in response to the opening movement of the mold. For this purpose the core 97 is of two-part form, viz. an inner cylinder 105 surrounded by the end of a co-axial, closely fitting sleeve 108. The cylinder 105 forms the head of a plunger 106 which passes with a clearance through the fixed mold member, and has a small collar 107 at its other end which can be received, with a circumferential clearance, in the hollow spigot 100 in the thrust plate 99. The sleeve 108 extends into the body of the fixed mold member and is here provided with inwardly-projecting, diametrically-opposite studs 109 which engage in spiral grooves 110 in a sleeve 111 mounted on the plunger 106. This sleeve is flanged at its inner end 112 and this flange is secured to an ejector plate 113 by a pin 114.

Opening of the mold set is initiated, as in the preceding case, by a stroke of plunger 62 which, in this instance, drives against spigot 100. The first result is the immediate splitting of the mold at the parting line 102 by rods 101, followed almost instantaneously by the engagement of mold half 95 by the magnetic heads 75 as described above. This movement of mold half 95 slips the die 96 over the molding 104 which at this stage is held to core 97 because of the screw-threaded engagement.

As the thrust plate 99 continues to the right it picks up ejector plate 113 and this is pushed along through chamber 98, so that the sleeve 111 moves to the right. Because of fastening 114 it can rotate, which means that studs 109 are forced to follow grooves 110 and the sleeve 108 is rotated. As a consequence the molding is progressively unscrewed from core 97. During this time the collar 107 of plunger is telescoping in spigot 100, leaving the plunger 106 undisturbed.

Eventually, however, the collar 107 hits the bottom of the spigot and a rightwards movement of plunger 106 and its head 105 follows. By this time the molding has been fully unscrewed from mandrel 97 and the ultimate result is the ejection of this molding by the thrust of plunger 106.

I claim:

1. An injection molding machine comprising a headstock, a tailstock, horizontal bracing tie bars extending between the headstock and the tailstock, a mold set carrier plate rotatably mounted on one of said tie bars, means for moving the carrier plate toward and away from the headstock, an injector unit mounted at that side of the headstock opposite to the carrier plate and directed toward the carrier plate through an opening in the headstock, a magnetic device disposed laterally of the headstock and movable toward and away from the carrier plate to close and open successive mold units thereon, said magnetic device comprising at least one projecting electromagnet adapted to be energized by the operation of a switch effected by the closing movement of the carrier plate toward the headstock, and pusher means associated with the electromagnet and movable substantially concomitantly with the deenergizing of the magnet to insure the parting of the mold unit from the magnet.

2. An injection molding machine comprising a headstock, a carrier for a plurality of mold sets rotatably supported from said headstock, means correlated with the rotation of the carrier to move the latter toward and away from the headstock, a magnetic device supported by the headstock and operable in response to closure of the carrier toward the headstock to engage the adjacent part of a mold set presented by the carrier and to reciprocate axially of the set carrying said mold part with it thereby to open and then to reclose the set, a sub frame attached to said headstock, a carriage for the magnetic device supported on said sub frame, piston and cylinder means coupled to said carriage and adapted to impart a reciprocating motion thereto, and means timed with the carrier movement for operating said piston and cylinder means, said sub frame being disposed in a lateral recess in the headstock and pivoted to the headstock to enable the magnetic device to be swung into an out of the way position.

References Cited in the file of this patent

UNITED STATES PATENTS

| | | |
|---|---|---|
| 1,751,869 | Mayne | Mar. 25, 1930 |
| 2,080,783 | Petersen | May 18, 1937 |